United States Patent Office
3,549,403
Patented Dec. 22, 1970

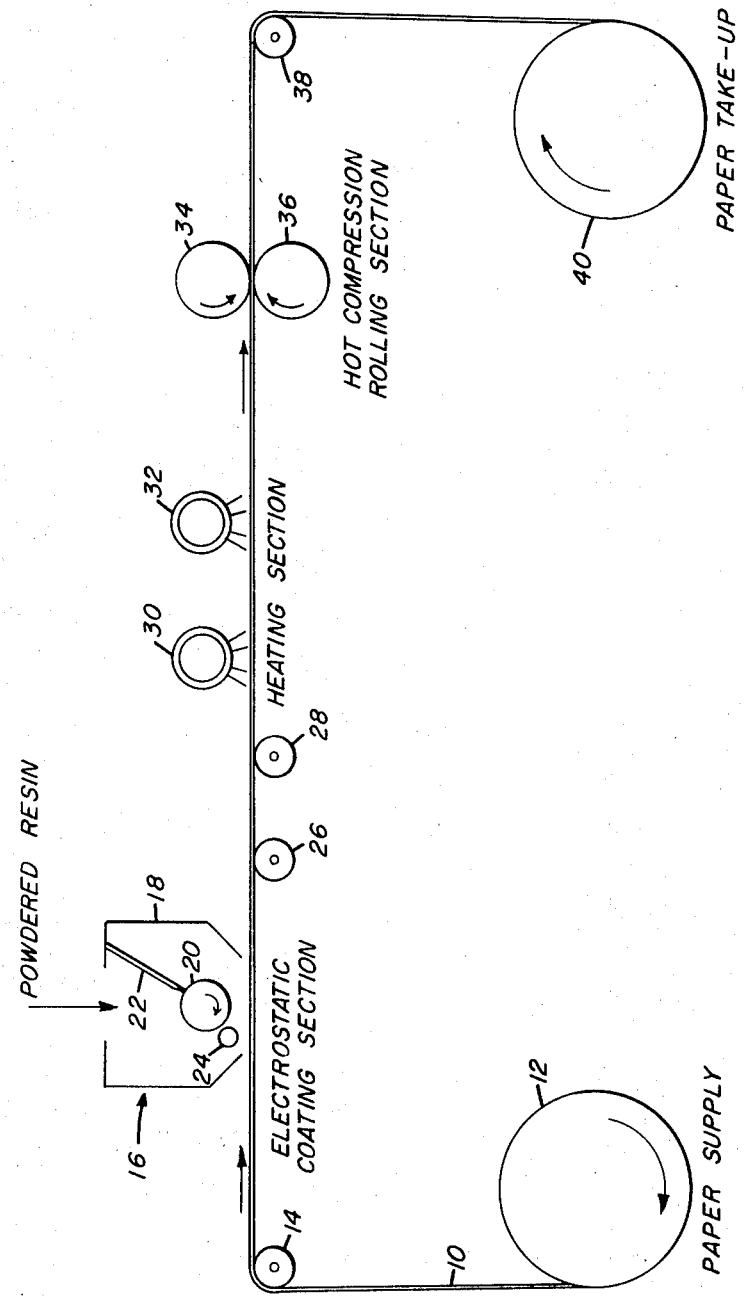

3,549,403
METHOD OF COATING PAPER WITH THERMOPLASTIC RESINS
Robert F. Williams, Jr., and Herbert S. Barbehenn, Rochester, N.Y., assignors to Eastman Kodak Company, Rochester, N.Y., a corporation of New Jersey
Filed Feb. 19, 1968, Ser. No. 706,464
Int. Cl. B44d 1/094, 1/44
U.S. Cl. 117—17                       11 Claims

ABSTRACT OF THE DISCLOSURE

Dry, powdered, thermoplastic polymeric resin, such as powdered polyethylene, is applied to a sheet of uncalendered paper in a manner providing a uniform coating, for example, by electrostatic coating or hopper coating, and then the coated sheet is subjected to hot compression rolling to form the polymer particles into an adherent film strongly bonded to the paper.

BACKGROUND OF THE INVENTION

(1) Field of the invention

This invention pertains in general to the paper coating art and in particular to the coating of paper with thermoplastic polymeric resins. More specifically, the invention pertains to resin coated paper having a coating which is free from surface irregularities and strongly adherent to the paper substrate and, in a particular aspect, to polyethylene coated paper meeting the rigid quality standards required for photographic use.

(2) Description of the prior art

Resin coated papers have been produced commercially for many years and a wide variety of coating methods have been developed. These methods have typically come within one of four broad classes, namely, melt or extrusion coating, coating from solvent dopes, coating from aqueous dispersion, and powder coating with subsequent oven heating to fuse the powder particles. Paper coated by one or other of these techniques has been utilized in numerous applications. However, serious difficulty is encountered with the methods of paper coating known heretofore where it is necessary to produce, at reasonable cost, a coating of uniform thickness which is free of surface irregularities such as is necessary, for example, in preparing polyethylene coated paper for photographic use. Thus, for example, in application of melt coating techniques to production of polyethylene coated paper, occluded particles resulting from oxidation of the polyethylene at the high temperatures required for extrusion are formed in large numbers and these particles result in a rough and irregular surface which is seriously detrimental to the attainment of a uniform surface when the photographic emulsion is subsequently applied to the polyethylene coating. High quality coatings can be applied from solvent dopes or aqueous dispersions but only at prohibitive cost; whereas methods of coating paper with dry powdered resins known heretofore, though of relatively low cost, have not been successful in producing a product of high quality. It is, accordingly, toward the objective of providing a simple, economical and commercially practical process for producing high quality coatings of thermoplastic polymeric resins on paper that the present invention is directed.

SUMMARY OF THE INVENTION

In its broadest aspects, the present invention is a method of applying to paper an adherent coating of a thermoplastic polymeric resin and this method is adaptable to widespread and diverse application in the paper coating art. The method is described herein with particular emphasis on the preparation of polyethylene coated paper suitable for photographic use and with particular regard to the use of electrostatic dispersion to form a uniform coating of the polyethylene powder on the paper surface. However, other techniques for coating the powdered resin on the paper can be utilized and thermoplastic polymers other than polyethylene are equally amendable to use with the method disclosed and claimed herein.

In accordance with this invention, a thermoplastic polymeric resin in dry finely-divided form is applied to the surface of a sheet of uncalendered paper to form a uniform coating over such surface and the coated paper is then subjected to hot compression rolling to fuse the polymer particles and form an adherent polymer film which is strongly bonded to the paper. It is a critical feature of the invention that the resin is applied to paper which has not been previously subjected to calendering. By this means, paper fibers are embedded in or partially encapsulated by the polymer particles and during the hot compression rolling step opposite ends of these fibers are entangled or compressed into the body of the paper, thereby forming, in effect, a mechanical bond between the paper and the coating. This mechanical bond results in the formation of a strongly adherent coating and eliminates the necessity of subbing the paper in order to obtain adhesion of the coating to the paper substrate, as is frequently required in melt or dope coating operations.

Application of the finely-divided polymer to the paper to produce a uniform coating may be carried out by various means known to the art. It is preferred to employ electrostatic dispersion but other methods which are known to the powder coating arts, such as hopper coating, and the like, can be employed if desired. The hot compression rolling step which follows application of the dry finely-divided polymeric resin to the paper is conducted under closely controlled conditions of temperature and pressure, determined in accordance with the characteristics of the particular resin involved.

BRIEF DESCRIPTION OF THE DRAWING

The single figure of the drawing is a schematic representation of the method of this invention illustrating application of a powdered resin to a sheet of uncalendered paper by electrostatic dispersion and subsequent hot compression rolling of the coated paper.

DESCRIPTION OF THE PREFERRED EMBODIMENT

As shown in the drawing, sheet 10 of uncalendered paper is unwound from supply roll 12 which is mounted for rotation about its axis on a suitable framework (not shown) and passes over idling roller 14 and directly beneath an electrostatic coating apparatus indicated generally by the number 16, which extends across approximately the full width of moving sheet 10. Electrostatic coating apparatus 16, which is fed with dry powdered thermoplastic resin from a suitable supply source, comprises hopper 18 in which there is mounted micro-etched chrome-plated roller 20 which frictionally engages stainless steel wiper blade 22 and is positioned closely adjacent to electron tube 24. Roller 20 is driven by a suitable variable speed motor (not shown) and as it rotates it picks up the powdered resin within hopper 18 and this resin is wiped into the etched surface as it passes beneath wiper blade 22. Electron tube 24, which is of a length approximately equal to the length of hopper 18, is supplied with high voltage current from a suitable transformer and power supply system (not shown) and the flow of electricity through electron tube 24 creates an electrostatic field which blasts the powder out of the micro-etchings on the surface of roller 20 and distributes it evenly over the surface of moving sheet 10. In this manner, after passing through the electrostatic coating section of the coating line illustrated, paper sheet 10 will carry a uniform, lightly adherent coating of dry powdered resin on its upper surface. The powder coated paper, supported by idling rollers 26 and 28, then passes closely adjacent to infrared heaters 30 and 32 where its temperature is raised to an elevated level, such as 200° F., and thence between heated compression rolls 34 and 36, each of which is mounted so as to permit rotation about its axis. Rolls 34 and 36 are connected to a suitable drive means (not shown) and are equipped with heating means (not shown), such as electrical heating elements or steam coils positioned within the interior of the rolls, and also with means for adjusting the nip pressure (not shown), such as adjustable clamps or springs, to exert a relatively high pressure on the coated paper sheet, for example, a pressure of several hundred pounds per linear inch. Upon leaving compression rolls 34 and 36, sheet 10, carrying a uniformly thick, continuous, adherent resin coating on the upper surface thereof, passes over idling roller 38 and is wound up on take-up roll 40 which is driven by a motor and speed reducer (not shown) at a suitable rate commensurate with the speed of travel of sheet 10 which, in turn, is determined by the rate at which compression rolls 34 and 36 are rotated.

The specific conditions under which the process of this invention is operated will, of course, depend upon the particular thermoplastic resin employed and upon the intended use for the resin coated paper. The method may be used to coat only a single side of the paper or, if desired, the paper may be coated on both sides in a single traverse of the complete coating line by employing two electrostatic coaters and a multiple roll stack. By adjusting the temperature of the compression rolls, the coated paper may be produced with a high gloss finish or with a matte finish.

Suitable conditions and apparatus for effecting application of a powdered resin to sheet material such as paper by electrostatic dispersion are well known in the art and, accordingly, need not be described in detail herein. Powder coating methods of this type are described, for example, in U.S. Pats. 2,742,185 and 2,748,018. Commercial electrostatic dispersion equipment suitable for carrying out the powder coating step of the method of this invention is widely available. Other suitable methods of applying a uniform coating of a dry powder to a paper sheet which are known to the art may be employed in place of electrostatic dispersion. Thus, for example, the powdered resin may be sifted or sprayed onto the paper, or spread on the paper from a hopper or with the aid of a doctor blade, or applied by a conveyor utilizing a vibrating or oscillating screen or tray.

The temperature and pressure under which fusion of the resin particles is effected at the compression rolls should be closely controlled to obtain optimum results, but the process is operable under any combination of temperature and pressure sufficient to fuse the polymer particles and form a continuous adherent film. The minimum operable temperature at the compression rolls is that sufficient to raise the temperature of the resin to the softening point while the maximum operable temperature is ordinarily determined by the temperature at which the paper is significantly degraded. In selecting suitable operating conditions, the temperature at which the resin oxidizes and/or sticks excessively to the compression rolls must, of course, also be considered. The minimum operable pressure that is necessary to adhere the film to the paper while the maximum operable pressure is represented by the pressure at which failure of the paper will occur and thus is determined by the strength of the particular paper sheet involved. For coating polyethylene, the temperature of the compression rolls should ordinarily be such as to maintain the coated paper passing between the rolls at a temperature within the range from about 150° F. to about 400° F., and preferably within the range of about 250° F. to about 350° F., while the pressure should ordinarily be maintained at about 100 to about 6000 pounds per linear inch, and preferably at about 400 to about 1500 pounds per linear inch. Optimum conditions of temperature and pressure for use with other thermoplastic polymers can be readily determined by a few routine experiments. As would be apparent to those skilled in the art, the temperature of the compression rolls must be selected in accordance with several criteria including roll diameter, the temperature at which the polymer softens, and the speed of travel of the paper sheet.

As pointed out hereinbefore, the method of this invention involves application of the polymeric resin to paper which is in an uncalendered state. Before application of the resin the paper should be dried to remove excess moisture which would have a detrimental effect on the resin coating and, in this regard, it is preferred that the moisture content of the paper be about 5 percent or less.

Heating of the paper and resin particles to the temperature necessary for fusion of the resin can be accomplished solely by heating the compression rolls but it is preferable to first heat the coated paper by infrared heaters, or other means such as circulating warm air or a heating chamber, to a temperature somewhat below that at which the compression rolls are maintained and then pass the hot coated paper between the hot compression rolls. Where it is desired to obtain a high gloss finish both compression rolls should be maintained at the same temperature, whereas a matte or low gloss finish can be obtained by maintaining the roll which contacts the uncoated paper surface at room temperature and heating the roll which contacts the coated surface.

The speed at which the paper is advanced is determined by the speed at which the compression rolls are rotated and, depending on the desired rate of production, the nature of the particular resin employed, and the other operating conditions, may range from as low as a few feet per minute to as high as several thousand feet per minute. To achieve the desired compression and avoid stretching of the paper, both compression rolls should preferably be driven at the same speed.

The method of this invention can be carried out with any thermoplastic polymeric resin which in fine particulate form is capable of flowing and being compressed into a continuous layer at temperatures and pressures under which both the polymer and the paper substrate are stable, i.e. will not be seriously damaged or degraded. As would be apparent to one skilled in the art, the melt viscosity of the polymer employed must not be so high as to result in tearing of the paper in the nip of the compression rolls. Thus, with polyethylene it is preferred to employ a resin having a melt index of at least about 20 and particularly preferred to have a melt index of at last about 50.

As employed herein, and in the appended claims, the term "thermoplastic polymeric resin" is intended to include both natural and synthetic polymers which are thermoplastic in nature. Illustrative of the many thermoplastic polymers which can be utilized in the method of this invention there may be mentioned polyethylene, polypropylene, copolymers of ethylene or propylene with copolymerizable ethylenically unsaturated monomers such as vinyl acetate or ethyl acrylate, polyvinyl acetate, waxes, prepolymers of polyethylene terephthalate, polyesters such as those produced by reaction of glycols such as ethylene glycol or propylene glycol with dicarboxylic acids such as sebacic acid, adipic acid, azelaic acid, brassylic acid, and the like, cellulose esters, polyethylene oxide, and the like. The polymeric resin may contain various pigments and, if desired, it may also contain plasticizers, antioxidants, slip agents, and the like. With certain of the thermoplastic polymers which tend to stick to the compression rolls, a release agent, such as a silicone, may be advantageously employed to coat the rolls before operation of the process is commenced.

The particle size of the polymer employed is not narrowly critical, but the optimum size will depend upon several variables such as the melt viscosity, compressability, and softening temperature of the polymer and the desired weight ratio of polymer coating to paper substrate. With polyolefin resins, particles ranging in size from as small as about 10 microns, or less, to as large as about 25 mesh can ordinarily be utilized with satisfactory results. Under typical conditions, improved results are obtained with polyolefin resins by using very small particles and the presence of excessively large particles, i.e. larger than a size corresponding to about 25 mesh, should be avoided as they will tend to cut the paper. The lower the melt viscosity of the resin the larger the particle size that can be used so that with resins of lower melt viscosity than the polyolefins the mesh size may be below 25 mesh.

The method of this invention can be conveniently and advantageously employed as a step in the conventional paper manufacturing process by applying the dry powdered resin to the moving web of paper between the dryer and the calender stack and utilizing the calender rolls to effect the compression rolling step. Alternatively, it may be conducted as a separate and distinct operation in which uncalendered paper in roll or sheet form is employed as the starting material to which the resin is applied.

The method of this invention is capable of producing polymer coated paper of exceptional quality. This is believed to be at least partially attributable to the fact that a "hydrostatic wedge" of molten resin is built up in the nip of the compression rolls and acts to effectively fill in the pores of the paper and thereby give a smooth uniform surface. Moreover, since the time for which the resin is subjected to elevated temperatures is relatively short, and since these temperatures are lower than the temperatures required in prior art processes such as melt extrusion, the degree of oxidation to which the resin is subjected is minimized. Polyethylene coated paper produced in the manner described herein has been found to be of attractive appearance, to possess effective moisture barrier properties, and to be almost completely free of surface irregularities. The polyethylene coated paper is suitable for production of photographic paper, where quality standards are exceptionally high, as it is sufficiently smooth to permit application of a precisely uniform layer of photographic emulsion to the polyethylene surface.

The invention is further illustrated by the following examples of its practice. In these examples, all tests were conducted in substantial accordance with standard TAPPI test procedures, except that tear strength was determined on four thicknesses of paper.

EXAMPLE 1

A twelve-inch wide sheet of uncalendered paper prepared from a softwood bleached sulfite pulp and having a thickness of 10.7 mils was passed through an electrostatic coating apparatus (manufactured by Oxy-Dry Sprayer Corporation) and dry powdered polyethylene having a melt index of 200 and a particle size of 60 mesh was uniformly dispersed over the top surface of the paper. The powder-coated paper was then heated to approximately 200° F. by passing it under a bank of infrared heaters and fed into the nip of a two roll mill in which each roll had a diameter of 10½ inches and was driven at a constant speed of 2 revolutions per minute. Both rolls were maintained at a temperature of 310° F. by means of electrical heating elements in the interior thereof and clamped to provide a pressure of 400 pounds per linear inch. The paper passing out of the roll mill was discarded as waste until such time as the surface of the roll contacting the powder coated side of the paper was coated with polyethylene and a bead of polyethylene had built up in the nip, whereupon the coated paper was wound on a take-up roll. The coated paper was then passed through the electrostatic coating apparatus a second time in such manner as to coat the side which was not coated previously and then the paper was heated with the infrared heaters and passed through the roll mill under the same conditions as previously employed. The resulting product was uniformly coated on each side with a smooth glossy surface of polyethylene that was free of irregularities and the polyethylene layers were strongly bonded to the paper so that they could not be separated therefrom. The total amount of polyethylene applied to the paper amounted to 10.75 pounds per one thousand square feet of paper and the finished product had a thickness of 11.7 mils. Properties of the uncoated paper and the coated paper were as follows:

| | Uncoated paper | Coated paper |
|---|---|---|
| Weight, lbs./1,000 ft.² | 44.5 | 55.25 |
| Thickness, mils | 10.7 | 11.7 |
| Tear strength, lbs.: | | |
| Lengthwise | 97 | 132 |
| Widthwise | 105 | 163 |
| Wet strength, lbs | 21 | 37 |
| Pentration, acid 40/20 | 25 | >2,000 |
| MIT Fold (1 kg.): | | |
| Lengthwise | 7 | 10 |
| Widthwise | 5 | 6 |
| Percent humidity size change: | | |
| Shrinkage | 0.635 | 0.547 |
| Expansion | 0.641 | 0.546 |

EXAMPLE 2

A twelve-inch wide sheet of the uncalendered paper described in Example 1 was coated in the same manner with the same powdered polyethylene except that the roll contacting the uncoated paper surface was maintained at 75° F. and the roll contacting the polyethylene coated surface was maintained at 325° F. The resulting product had a uniform, adherent coating of polyethylene having a matte or low gloss surface. A section of the same powder-coated paper was then passed successively through the five nips of a six roll stack, instead of through the two roll mill, with each roll being rotated at a speed of 2 revolutions per minute and maintained at a temperature of about 160° F. and with a pressure of 1000 pounds per linear inch applied in each nip. The resulting product had a smooth, uniform, adherent coating of polyethylene having a high gloss surface. Properties of the uncoated paper, of the paper coated on one side with polyethylene having a matte surface, and of the paper coated on one side with polyethylene having a high gloss surface, were as follows:

| | Uncoated paper | Paper with matte surface | Paper with high gloss surface |
|---|---|---|---|
| Weight, lbs./1,000 ft.² | 44.5 | 46.75 | 47.4 |
| Thickness, mils | 10.7 | 9.1 | 8.2 |
| Tear strength, lbs.: | | | |
| Lengthwise | 97 | 100 | 115 |
| Widthwise | 105 | 112 | 170 |
| Wet strength, lbs | 21 | 22 | 12 |
| Penetration, acid, 40/20 | 25 | 87 | 26 |
| MIT Fold (1 kg.): | | | |
| Lengthwise | 7 | 11 | 11 |
| Widthwise | 5 | 7 | 8 |
| Percent humidity size change: | | | |
| Shrinkage | 0.635 | 0.565 | 0.591 |
| Expansion | 0.641 | 0.667 | 0.659 |

With either of these polyethylene coated papers, a peelable heat seal could be obtained by lapping together coated and uncoated surfaces and passing a sealing iron heated to 380° F. over the paper; while a tearing heat seal could be obtained by lapping together two coated surfaces and passing a sealing iron heated to 270° F. over the paper.

EXAMPLE 3

A light weight uncalendered paper prepared from bleached kraft pulp was coated on both sides with polyethylene using the equipment and conditions described in Example 1. Properties of the paper before and after coating were as follows:

|  | Uncoated paper | Coated paper |
|---|---|---|
| Weight, lbs./1,000 ft.² | 12 | 19 |
| Thickness, mils | 2.8 | 4.8 |
| Tear strength, lbs.: | | |
| Lengthwise | 70 | 68 |
| Widthwise | 64 | 70 |
| Wet strength, lbs | 2 | 13 |
| Penetration, acid, 40/20 | 1 | >2,000 |
| MIT Fold (1 kg.): | | |
| Lengthwise | 118 | 203 |
| Widthwise | 97 | 166 |
| Percent humidity size change: | | |
| Shrinkage | 0.498 | 0.398 |
| Expansion | 0.701 | 0.521 |

EXAMPLE 4

A light weight uncalendered black paper, classified as "light-fast" for photographic applications, was coated on both sides with polyethylene using the equipment and conditions described in Example 1. Properties of the paper before and after coating were as follows:

|  | Uncoated paper | Coated paper |
|---|---|---|
| Weight, lbs./1,000 ft.² | 16 | 24 |
| Thickness, mils | 3.6 | 5.0 |
| Tear strength, lbs.: | | |
| Lengthwise | 53 | 58 |
| Widthwise | 49 | 55 |
| Wet strength, lbs | 2 | 41 |
| Penetration, acid, 40/20 | 1 | >2,000 |
| MIT Fold (1 kg.): | | |
| Lengthwise | 15 | 31 |
| Widthwise | 14 | 61 |
| Percent humidity size change: | | |
| Shrinkage | 0.528 | 0.420 |
| Expansion | 0.736 | 0.510 |

EXAMPLES 5-14

Samples of the uncalendered paper described in Example 3 were coated on both sides with several different thermoplastic polymeric resins in fine dry particulate form. In each instance, the test was conducted using the equipment and conditions described in Example 1 except that compression rolling was carried out at a pressure of 1000 pounds per linear inch with both rolls at a temperature of 300° F., the particle size was 50 mesh, and the total resin coverage was 6 pounds per one thousand square feet of paper. Results obtained are summarized in Table I below, with the data for uncoated paper being included for comparison purposes.

As evidenced by the working examples presented hereinabove, the method of this invention is readily applicable to a variety of finely-divided thermoplastic polymeric resins and is capable of providing a high quality resin coated paper. Because the method utilizes relatively simple equipment and can be conveniently employed as a step in the conventional paper making process, the economics of its operation are very advantageous as compared with resin coating techniques known heretofore.

The method of this invention will ordinarily be practiced on a continous or semi-continuous basis by applying the resin to a moving web of paper during the paper manufacturing process or to a moving web taken from a roll of large diameter. However, if desired, the method may also be practiced in a batch manner by applying the coating of resin to a discrete section of paper of short length and then passing this piece of resin coated paper through the compression rolls. Accordingly, the term "a sheet of uncalendered paper," as employed herein and in the appended claims, is meant to include both discrete sheets of short lengths as well as continuous sheets or webs of great length such as are ordinarily handled in the form of rolls.

The invention has been described in detail with particular reference to preferred embodiments thereof, but it will be understood that variations and modifications can be effected within the spirit and scope of the invention as

TABLE I

| Example No. | Resin | Wet strength, lbs. | Penetration acid, 40/20 | MIT Fold (1 kg.) Lengthwise | MIT Fold (1 kg.) Widthwise | Percent humidity size change Shrinkage | Percent humidity size change Expansion | Gardner gloss |
|---|---|---|---|---|---|---|---|---|
| Control | None | 2 | 1 | 118 | 97 | 0.498 | 0.701 | 12 |
| 5 | Carnauba wax | 5 | 152 | 166 | 104 | 0.523 | 0.571 | 25 |
| 6 | Emulsifiable oxidized polyethylene having a molecular weight of approximately 2,500, a ring and ball softening point of 105-106° C., and a Brookfield viscosity at 120° C. of 1,500 centipoises. | 7 | 222 | 150 | 85 | 0.461 | 0.424 | 29 |
| 7 | Emulsifiable oxidized polyethylene having a molecular weight of approximately 1,500, a ring and ball softening point of 104-106° C., and a Brookfield viscosity at 120° C. of 400 centipoises. | 6 | 226 | 132 | 58 | 0.435 | 0.460 | 31 |
| 8 | Emulsifiable oxidized polyethylene having a molecular weight of approximately 1,500, a ring and ball softening point of 110-111° C., and a Brookfield viscosity at 120° C. of 445 centipoises. | 7 | 259 | 128 | 63 | 0.488 | 0.443 | 32 |
| 9 | Poly (ethylene sebacate) having a melting point of 67° C. and an intrinsic viscosity* of 0.18. | 18 | 562 | 361 | 140 | 0.563 | 0.554 | 21 |
| 10 | Poly (ethylene brassylate) having a melting point of 65° C. and an intrinsic viscosity* of 0.59. | 7 | 185 | 132 | 140 | 0.517 | 0.520 | 35 |
| 11 | Polyester having a melting point of 109° C. and an intrinsic viscosity* of 0.31 prepared by reacting cyclohexanedimethanol with a mixture of 3 parts adipic acid to 1 part azelaic acid. | 8 | 367 | 303 | 285 | 0.540 | 0.483 | 32 |
| 12 | Low density polyethylene having a molecular weight of approximately 10,000 and a melt index of 170-230. | 13 | >2,000 | 203 | 166 | 0.398 | 0.521 | 34 |
| 13 | Mixture of 95% low density polyethlene having a molecular weight of approximately 10,000 and a melt index of 170-230 and 5% of micronized microcrystalline petroleum wax. | 10 | 295 | 124 | 114 | 0.543 | 0.538 | 41 |
| 14 | Mixture of 90% low density polyethylene having a molecular weight of approximately 10,000 and a melt index of 170-230 and 10% of a fatty amide slip agent. | 7 | 143 | 74 | 48 | 0.480 | 0.550 | 40 |

*Intrinsic viscosity was determined in a mixture of 6 parts phenol to 4 parts chlorobenzene at a temperature of 25° C. and a concentration of 0.25 grams of polymer per 100 milliliters of solvent using a Wagner viscometer.

We claim:

1. A method of preparing resin coated paper which comprises applying a uniform coating of a thermoplastic polymeric resin in dry finely-divided form by electrostatic dispersion to a sheet of uncalendered paper having a moisture content of less than about five percent and passing said coated sheet between heated compression rolls which apply heat and pressure sufficient to fuse the resin particles and form a continuous adherent film thereof strongly bonded to the paper, said compression rolls being maintained at a temperature which is at least sufficient to raise the temperature of said resin to the softening point but is less than the temperature at which said paper sheet is degraded.

2. The method as described in claim 1 wherein the coated sheet is subjected to heating before being passed between said heated compression rolls.

3. The method as described in claim 1 wherein said sheet is coated with said resin on only one side thereof.

4. The method as described in claim 1 wherein said sheet is coated with said resin on both sides thereof.

5. The method as described in claim 1 wherein the thermoplastic polymeric resin is polyethylene.

6. The method as described in claim 5 wherein the heated compression rolls subject the coated sheet to a temperature in the range from about 150° F. to about 400° F. and a pressure in the range from about 100 to about 6000 pounds per linear inch.

7. The method as described in claim 5 wherein the heated compression rolls subject the coated sheet to a temperature in the range from about 250° F. to about 350° F. and a pressure in the range from about 400 to about 1500 pounds per linear inch.

8. The method as described in claim 5 wherein the polyethylene has a melt index of greater than 20 and a particle size of smaller than 25 mesh.

9. The method as described in claim 5 wherein each roll is maintained at substantially the same temperature.

10. The method as described in claim 5 wherein a compression roll contacting uncoated paper surface is maintained at about room temperature while a compression roll contacting polyethylene coated paper surface is maintained at an elevated temperature.

11. A method of preparing polyethylene coated paper which comprises applying to a sheet of uncalendered paper, having a moisture content of less than about five percent, by electrostatic dispersion a uniform coating of dry finely-divided polyethylene having a melt index of greater than 50 and a particle size of smaller than 25 mesh and passing said polyethylene coated sheet between heated compression rolls which subject it to a temperature in the range of from about 250° F. to about 350° F. and a pressure in the range of from about 400 to about 1500 pounds per linear inch to fuse the polyethylene particles and form a continuous adherent film thereof strongly bonded to the paper.

References Cited

UNITED STATES PATENTS

| | | | |
|---|---|---|---|
| 2,513,434 | 7/1950 | Tinsley | 117—21X |
| 2,775,994 | 1/1957 | Rowe | 117—21 |
| 3,039,913 | 6/1962 | Merrill et al. | 162—136 |
| 3,047,415 | 7/1962 | Rhodes et al. | 117—21 |
| 3,112,985 | 12/1963 | Schoppmeyer et al. | 162—168X |
| 3,256,138 | 6/1966 | Welch et al. | 117—21X |
| 3,338,736 | 8/1967 | Hain | 117—65.2X |
| 3,297,472 | 1/1967 | Gilman et al. | 117—65.2 |
| 3,385,722 | 5/1968 | Weaver et al. | 117—33X |
| 3,442,685 | 5/1969 | Lonas et al. | 117—65.2 |

OTHER REFERENCES

"Technical Papers," p. 46, Oct. 27, 1965.

WILLIAM D. MARTIN, Primary Examiner

R. M. SPEER, Assistant Examiner

U.S. Cl. X.R.

117—21, 155